US012640614B2

(12) United States Patent
Grelle et al.

(10) Patent No.: US 12,640,614 B2
(45) Date of Patent: May 26, 2026

(54) ELECTRICALLY EXCITED SYNCHRONOUS MACHINE

(71) Applicant: MAHLE International GmbH, Stuttgart (DE)

(72) Inventors: Thorsten Grelle, Stuttgart (DE); Florian Osdoba, Stuttgart (DE); Penyo Topalov, Stuttgart (DE); Philipp Zimmerschied, Stuttgart (DE)

(73) Assignee: Mahle International GmbH (DE)

( * ) Notice: Subject to any disclaimer, the term of this patent is extended or adjusted under 35 U.S.C. 154(b) by 215 days.

(21) Appl. No.: 18/705,525

(22) PCT Filed: Oct. 5, 2022

(86) PCT No.: PCT/EP2022/077661
§ 371 (c)(1),
(2) Date: Apr. 27, 2024

(87) PCT Pub. No.: WO2023/072538
PCT Pub. Date: May 4, 2023

(65) Prior Publication Data
US 2025/0038613 A1      Jan. 30, 2025

(30) Foreign Application Priority Data
Oct. 28, 2021    (DE) ..................... 10 2021 212 204.3

(51) Int. Cl.
*H02K 5/15*          (2006.01)
*B60K 11/02*        (2006.01)
(Continued)

(52) U.S. Cl.
CPC .............. *H02K 5/15* (2013.01); *H02K 5/203* (2021.01); *H02K 11/042* (2013.01); *B60K 11/02* (2013.01)

(58) Field of Classification Search
CPC ........ H02K 5/15; H02K 5/203; H02K 11/042; H02K 9/19; H02K 11/33; H02K 19/12;
(Continued)

(56) References Cited

U.S. PATENT DOCUMENTS 3,733,503  A      5/1973   Potter
4,739,204  A      4/1988   Kitamura
(Continued)

FOREIGN PATENT DOCUMENTS

DE        3751294 T2     10/1995
DE        19949140 A1     8/2000
(Continued)

OTHER PUBLICATIONS

English abstract for DE102012021600.
English abstract for DE102014202719.

*Primary Examiner* — Joseph Ortega
(74) *Attorney, Agent, or Firm* — Fishman Stewart PLLC

(57)        ABSTRACT

An electrically excited synchronous machine, comprising a stator having a stator housing with at least one axial end-face bearing shield and a stator coil for generating a magnetic stator field, a rotor having a rotor shaft rotatably supported at least on the bearing shield about a rotational axis and a rotor coil for generating a magnetic rotor field, and an energy transmission system having an energy transmitter for transmitting electric energy to the rotor coil, wherein the bearing shield contains at least one coolant channel and has a coolant inlet and a coolant outlet such that the bearing shield is actively cooled by a coolant conducted through the coolant channel, and the energy transmitter has at least one component fixed to the stator and arranged in or on the bearing shield so as to transfer heat.

20 Claims, 6 Drawing Sheets

Figure 1:
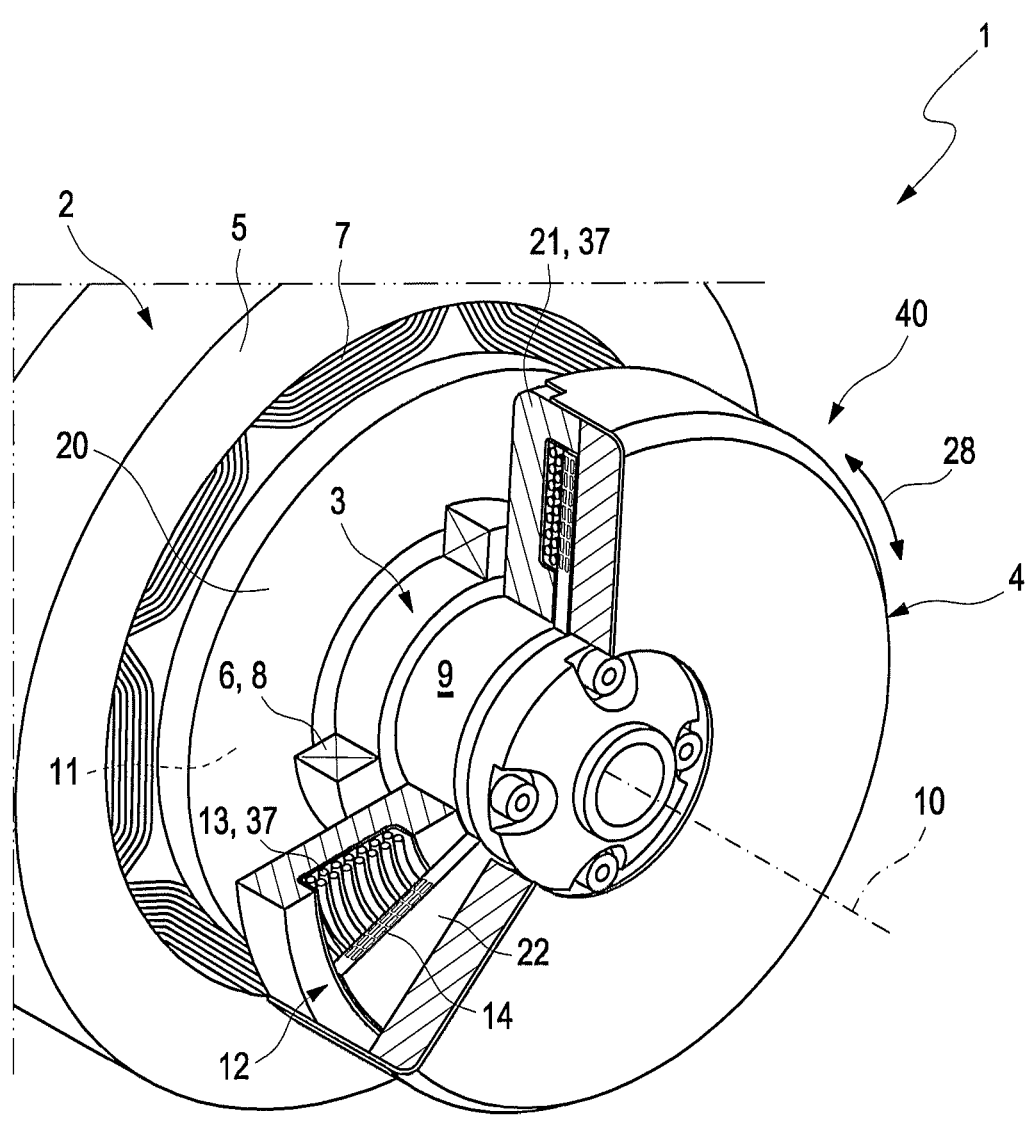

(51) Int. Cl.
    *H02K 5/20*         (2006.01)
    *H02K 11/042*     (2016.01)

(58) Field of Classification Search
    CPC ....... H02K 5/1732; B60K 11/02; H01F 27/12;
                                     H01F 38/18
    See application file for complete search history.

(56)                 References Cited

U.S. PATENT DOCUMENTS

| | | | | |
|---|---|---|---|---|
| 5,770,909 | A * | 6/1998 | Rosen | H02K 19/12 |
| | | | | 322/89 |
| 5,798,586 | A * | 8/1998 | Adachi | H02K 5/20 |
| | | | | 310/68 D |
| 6,169,344 | B1 | 1/2001 | Tsuruhara | |
| 7,023,113 | B2 | 4/2006 | Tajima | |
| 2002/0053841 | A1 | 5/2002 | Asao | |
| 2011/0012447 | A1 | 1/2011 | Himmelmann | |

FOREIGN PATENT DOCUMENTS

| | | | |
|---|---|---|---|
| DE | 60307924 T2 | 1/2007 | |
| DE | 102012021600 A1 | 5/2014 | |
| DE | 102014202719 A1 * | 8/2015 | ............. H01F 38/18 |

* cited by examiner

ELECTRICALLY EXCITED SYNCHRONOUS MACHINE

CROSS-REFERENCE TO RELATED APPLICATIONS

This application claims priority to International Patent Application No. PCT/EP2022/077661 filed Oct. 5, 2022, which also claims priority to German Patent Application DE 10 2021 212 204.3 filed Oct. 28, 2021, the contents of each of which is hereby incorporated by reference in its entirety.

TECHNICAL FIELD

The present invention relates to an electrically excited synchronous machine.

A generic synchronous machine is known from the US 2002/0 053 841 A1. Similar synchronous machines are also known from the U.S. Pat. No. 4,739,204 A and from the U.S. Pat. No. 3,733,503 A. Further conventional synchronous machines are also known from U.S. Pat. No. 5,798,586 A, from DE 10 2012 021 600 A1, from DE 10 2014 202 719 A1 and from U.S. Pat. No. 5,770,909 A.

An electrically excited synchronous machine comprises a stator, a rotor and an energy transmission system. The stator has a stator housing comprising at least one axially front-side bearing shield and a stator coil for generating a magnetic stator field. The rotor has a rotor shaft rotatably mounted at least on the bearing shield about an axis of rotation and a coil for generating a magnetic rotor field. The energy transmission system serves the purpose of transmitting electrical energy to the rotor coil and thus effects the electrical external excitation. In the case of an inductively operating energy transmission system, the latter can be equipped with an inductive energy transmitter, which can preferably be designed as rotary transformer, which has a stator-fixed primary transformer coil and a rotor-fixed secondary transformer coil.

High-performance synchronous machines are subjected to a high thermal stress. This applies in particular for all electrically active components or component parts, which contribute to the generation of the magnetic fields and to the electrical energy transmission, thus preferably for the energy transmitter as well as for a power electronics of the synchronous machine.

The synchronous machine is preferably designed as traction motor for a motor vehicle, which can in particular absorb an electrical power of 100 KW to 240 KW, preferably of 120 kW to 160 KW, particularly preferably of approximately 140 KW.

It is generally conceivable to cool the synchronous machine. The integration of a cooling jacket into the stator housing is common thereby. A suitable, in particular liquid, coolant can flow through the cooling jacket. It is further conceivable to arrange particularly vulnerable components of the power electronics so that the heat transmission to these components is reduced and/or the heat dissipation from these components is improved. However, this is generally associated with a high structural effort and a relatively large installation space requirement. Comparatively long electrical lines can further become necessary, which complicates the operation of the drive system and has a disadvantageous effect on the efficiency thereof and which increases the susceptibility of failure of the power electronics.

The present invention deals with the problem of specifying an improved or at least a different embodiment for a synchronous machine of the above-described type, which is in particular characterized by an improved heat dissipation. In particular an increased degree of integration and/or a higher power density are further desired.

This problem is solved according to the invention by means of the subject matter of the independent claim(s). Advantageous embodiments are subject matter of the dependent claims.

SUMMARY

The invention is based on the general idea of designing the bearing shield, which is located in the vicinity of the energy transmitter, in particular of the rotary transformer, as actively cooled bearing shield, so that heat generated during the energy transmission in the energy transmitter, can be dissipated effectively. For this purpose, the bearing shield is equipped with at least one coolant duct, comprising a coolant inlet and comprising a coolant outlet, so that the bearing shield can be actively cooled by means of a, preferably liquid, coolant, which is guided through the coolant duct. The invention thereby utilizes the knowledge that the energy transmitter is located close to this bearing shield, so that a cooling of the bearing shield can effectively dissipate heat of the energy transmitter. It is particularly advantageous thereby when the energy transmitter has at least one stator-fixed component. The latter can preferably be arranged in or on the bearing shield so as to transmit heat.

The coolant duct of the bearing shield can be embodied as part of an integrated cooling circuit. It can thereby form a part of a rotor cooling or of a rotor-spray cooling or be in the inlet or return of a wet-running synchronous machine. It is further conceivable to form the coolant duct as part of a stator cooling, in particular of a stator jacket cooling.

According to the invention, the energy transmitter is designed as inductive energy transmitter, so that it effects an inductive transmission of electrical energy to the rotor coil. The inductive energy transmitter is thereby equipped with a rotary transformer or is designed as such, which has a stator-fixed primary transformer coil and a rotor-fixed secondary transformer coil. The primary transformer coil thereby represents a stator-fixed component of the energy transmitter. The inductively operating energy transmission system then expediently has a rotor-side or rotor-fixed rectifier, respectively, which electrically connects the secondary transformer coil to the rotor coil.

According to the invention, the inductive energy transmitter is equipped with a ferrite core. Such a ferrite core as a whole can be designed as stator-fixed ferrite core or can have a stator-fixed ferrite core part and a rotor-fixed ferrite core part. In the following, reference will be made throughout to the ferrite core, whereby this then generally in each case refers to the entirely stator-fixed ferrite core and the stator-fixed ferrite core part. The ferrite core is arranged concentrically to the axis of rotation. The primary transformer coil is arranged in a stationary manner in this ferrite core or magnet core. The secondary transformer coil is rotatably arranged in the ferrite core. This ferrite core encapsulates the rotary transformer and significantly improves the electromagnetic coupling of the transformer coils. Heat, which develops during the energy transmission in the rotary transformer, is further quasi transmitted directly into the ferrite core. According to the invention, the ferrite core is arranged in or on the bearing shield so as to transmit heat. The heat can thus be transmitted efficiently from the ferrite core to the bearing shield and from the latter into the coolant and can be dissipated. This results in a particularly efficient cooling for the rotary transformer. The ferrite core can advantageously be arranged concentrically to the axis of rotation in or on the bearing shield. The ferrite core likewise represents a stator-fixed component of the energy transmitter.

In the case of an embodiment, which is not in accordance with the invention, the energy transmitter can be designed as conductively operating energy transmitter. The conductive energy transmitter can in particular have a slider assembly, which has at least one stator-fixed sliding contact. The respective sliding contact, which is in particular designed as brush, can be arranged in or on the bearing shield so as to transmit heat, in particular radially to the axis of rotation. On the rotor side, the conductive energy transmitter can have at least one rotor-fixed slip ring, with which the respective sliding contact cooperates. The respective slip ring can be formed, for example, on the rotor shaft.

According to an advantageous embodiment, it can be provided that the bearing shield has a receptacle, in which the stator-fixed component of the energy transmitter is arranged. On the one hand, the positioning of the respective component is simplified thereby, while on the other hand, the heat transmission is improved. This effects can optionally be improved when it is provided that the receptacle has an enclosure, the radial inner contour of which is adapted to a radial outer contour of the stator-fixed component of the energy transmitter. The respective component can abut axially in the receptacle and radially on the optional enclosure, wherein an indirect abutment via a thermally conductive material or a direct abutment are conceivable. Provided that the stator-fixed component in the case of an inductive energy transmitter is a ferrite core, the receptacle can be designed as core receptacle, which receives the ferrite core. The optional enclosure encloses the ferrite core radially. The ferrite core then abuts axially in the core receptacle and radially against the enclosure, directly or indirectly.

The thermal protection can also be improved in that the stator-fixed component of the energy transmitter, e.g., the ferrite core or the respective sliding contact, is arranged on an axial outer side of the bearing shield. The bearing shield can thus in particular be arranged axially between the ferrite core and a rectifier of the energy transmitter.

In the case of an advantageous embodiment, the coolant duct can run in an annular region of the bearing shield, which is arranged concentrically to the axis of rotation or to the ferrite core, respectively, The annular region surrounds the axis of rotation or the ferrite core, respectively, or the respective sliding contact, respectively, in the circumferential direction. Heat radially emanating from the stator-fixed component of the energy transmitter, thus in particular from the ferrite core or from the respective sliding contact, thus safely reaches into the annular region. By means of the arrangement of the coolant duct in the annular region, the heat can be dissipated efficiently.

Another embodiment proposes that the coolant duct extends over at least 180° in the circumferential direction, in particular along the ferrite core or the respective sliding contact. The coolant duct can preferably extend over at least 270° in the circumferential direction, in particular along the ferrite core or the respective sliding contact. The cooling effect is improved thereby.

According to the invention, the coolant duct runs in an annular segment-shaped cooling region of the bearing shield, which is arranged concentrically to the axis of rotation, and to the ferrite core, wherein this cooling region extends over at least 90" and preferably over at least 180° in the circumferential direction, in particular along the ferrite core. This measure also improves the dissipation of the heat from the stator-fixed component of the energy transmitter, in particular from the ferrite core.

The coolant duct can extend in a meander-shaped manner in this cooling region, in such a way that it runs back and forth between a radially inner end of the cooling region and a radially outer end of the cooling region. The cooling effect is significantly improved thereby because the surface, which is available for the heat transmission, is enlarged.

Alternatively thereto, the coolant duct can have a flat cross-section in the cooling region, which can be flown through and which extends from a radially inner end of the cooling region all the way to a radially outer end of the cooling region. This measure can also improve the heat dissipation because the surface available for the heat transmission is enlarged.

A further development is particularly advantageous, in the case of which a cooling structure is arranged or formed in the flat cross section of the coolant duct. The heat transmission between bearing shield and coolant is significantly improved by means of the cooling structure, which supports the efficiency of the cooling. The cooling structure can be formed by at least one separate component part, which is inserted into the coolant duct in the region of the flat cross section in a suitable way.

It is likewise conceivable to integrally mold the cooling structure on the bearing shield. The cooling structure can have ribs and/or nubs and/or fins and/or pins and/or the like.

In the case of another advantageous embodiment, at least one component of a stator-fixed power electronics of the synchronous machine can be arranged on the bearing shield so as to transmit heat. Due to the fact that the bearing shield is actively cooled, an efficient cooling of this component of the power electronics is thus also effected. This simultaneously results in significantly shortened ways for the electrical connection of the respective component of the power electronics, for example to the energy transmitter. The electrical lines required thereby accordingly become comparatively short, which reduces the generation of and susceptibility to inferences as well as interfering parasitic effects and power losses associated therewith as well as power inductances and power capacities accordingly. The respective component of the power electronics is preferably arranged on an axial outer side of the bearing shield. Depending on the space requirement for the respective components of the power electronics, the stator-fixed component of the energy transmitter, in particular the stator-fixed ferrite core or ferrite core part, respectively, can be arranged on the axial inner side of the bearing shield in this case.

An embodiment is particularly advantageous in this context, in the case of which the at least one component of the power electronics is arranged in the cooling region introduced further above on the bearing shield so as to transmit heat. A flat cooled region, which is suitable as assembly zone for the respective component of the power electronics, is provided on the bearing shield by means of the cooling region. The beat can thereby be absorbed and dissipated particularly favorably. It is likewise conceivable that individual, thermally particularly sensitive and/or stressed component parts are embedded into the cooling circuit. The can take place, for example, by means of recesses or depressions, in which the corresponding component parts are arranged.

The bearing shield can form a separate component part with respect to the stator housing, which is fastened to the bearing housing on the front side in a suitable way. It is likewise conceivable to integrally mold the bearing shield on the stator housing, for example in the form of a housing bottom, which axially limits the stator housing, which is designed in a pot-shaped manner on the front side. The stator housing is usually equipped with a bearing shield each on both front sides. At least one of these bearing shields is equipped with the cooling duct. It is likewise conceivable to equip both bearing shields with a cooling duct in each case.

In the case of another embodiment, the stator housing can be designed so that it does not have a stator cooling comprising stator coolant duct, which runs in the stator housing. This embodiment uses the knowledge that it is sufficient in the case of certain configurations to actively cool only the bearing shield with the coolant. For example, an additional passive cooling by means of an air flow within the/through the electrical machine is conceivable. This air flow can be guided along the cooled bearing shields, whereby an additional indirect cooling can optionally be attained by means of the bearing shields.

An alternative embodiment, in contrast, proposes to equip the stator housing with a stator cooling, which has a stator coolant duct running in the stator housing. In the case of the synchronous machine introduced there, however, the stator coolant duct is fluidically separated from the coolant duct in the bearing shield. Different cooling circuits on the one hand and/or different coolants on the other hand can be used thereby. The cooling of the bearing shield can thus in particular be optimally optimized with respect to coolant temperature, coolant flow speed and coolant through-flow quantity. In particular, different pressures, coolants, flow speeds and coolant temperatures can be used in the coolant duct of the bearing shield on the one hand and in the stator coolant duct on the other hand.

In the case of another advantageous embodiment, the synchronous machine can be designed as wet-running electrical machine. The synchronous machine has a cooling circuit, which guides a coolant through an interior space of the stator housing, in which the rotor and routinely also the stator is in contact with the coolant. This cooling circuit can now be fluidically coupled to the coolant duct of the bearing shield.

A pure rotor cooling or a pure stator cooling or a combined rotor-stator cooling are conceivable at this point. A rotor spray cooling, which runs through the rotor (e.g., supply via the rotor shaft) and thus cooling medium is flung from the rotor onto the stator, as well as a cooling by means of nozzles/outlets, which spray rotor and/or stator (optionally additional atomization by means of the rotor) are to be named as exemplary embodiments. An embodiment as wet-running synchronous machine can make a stator jacket cooling superfluous.

In the case of one embodiment, it can be provided that the rotor has a rotor cooling, in particular as or in combination with a rotor spray cooling, comprising a rotor coolant duct, which runs in the rotor. Advantageously, this rotor coolant duct can be fluidically coupled to the coolant duct in the bearing shield. An embodiment, in the case of which the coolant duct of the bearing shield is arranged in the feed line of the rotor coolant duct, thus upstream thereof, is particularly expedient thereby. For example, the rotor coolant duct can run through the rotor shaft.

Further important features and advantages of the invention follow from the subclaims, from the drawings and from the corresponding figure description on the basis of the drawings.

It goes without saying that the above-mentioned features and the features, which will be described below, cannot only be used in the respective specified combination but also in other combinations or alone, without leaving the scope of the invention. Component parts, which are mentioned above and which will be mentioned below, of a higher-level unit, such as, e.g., a means, a device or an assembly, which are identified separately, can form separate component parts or components, respectively, of this unit or can be integral regions or sections, respectively, of this unit, even if this is illustrated differently in the drawings.

Preferred exemplary embodiments of the invention are illustrated in the drawings and will be described in more detail in the following description, whereby identical reference numerals refer to identical or similar or functionally identical components.

Figure 2:
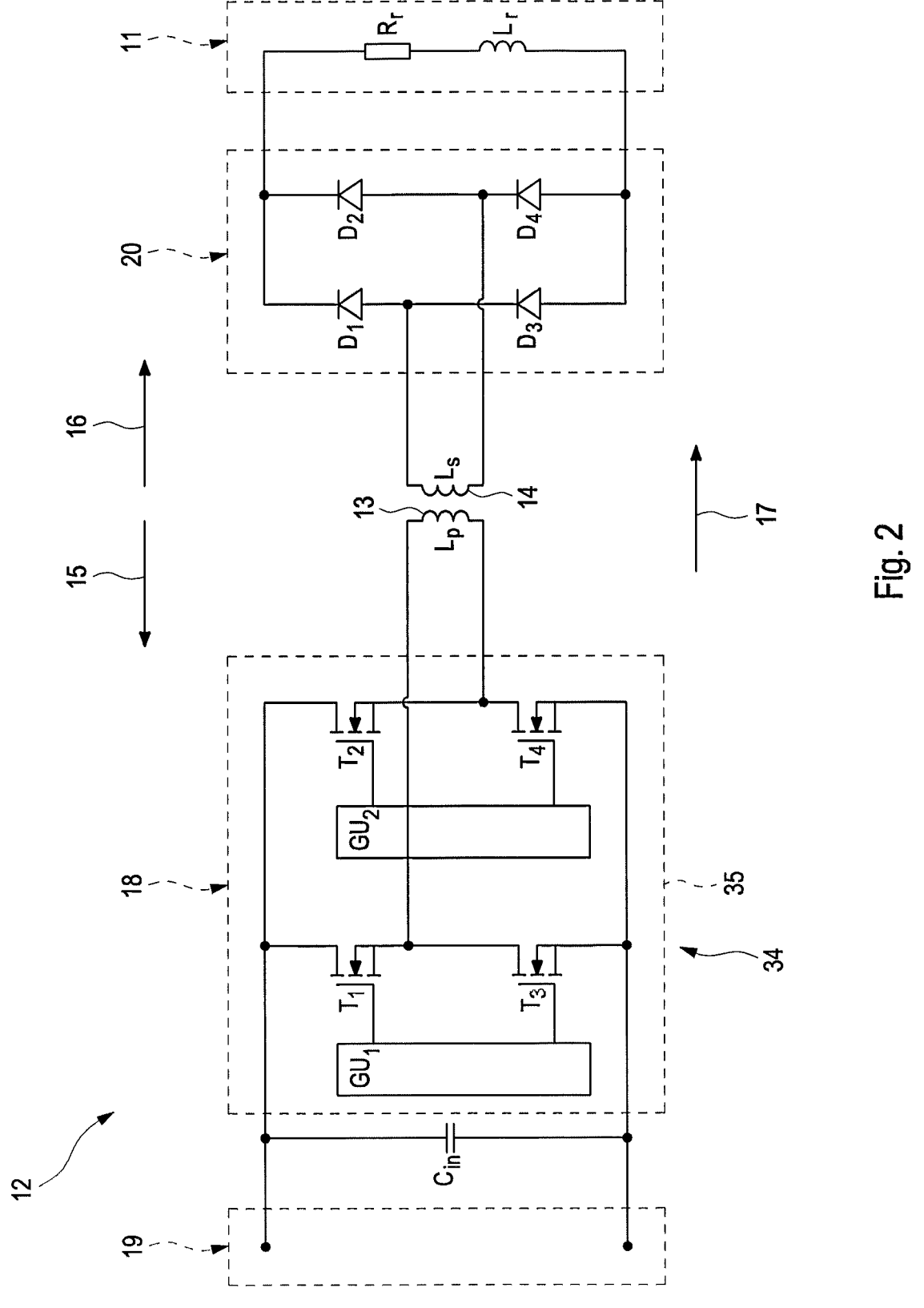
Figure 3:
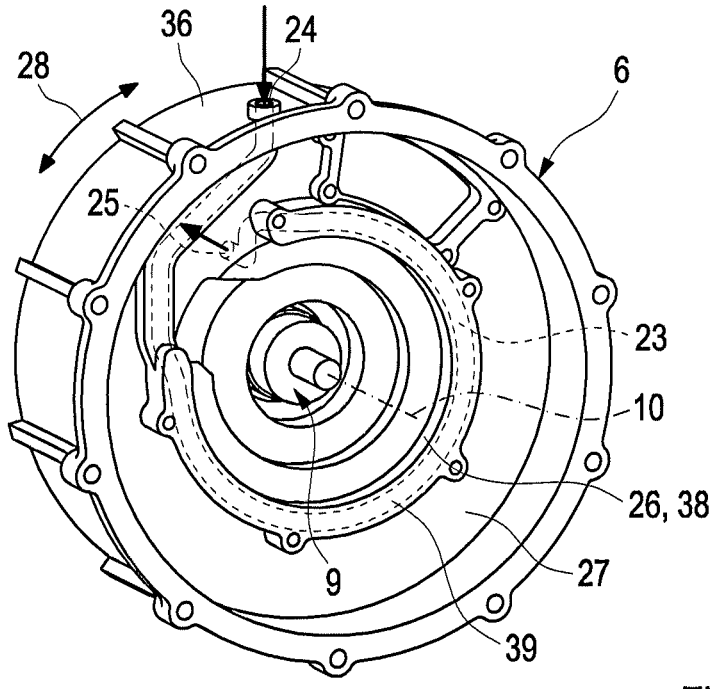
Figure 4:
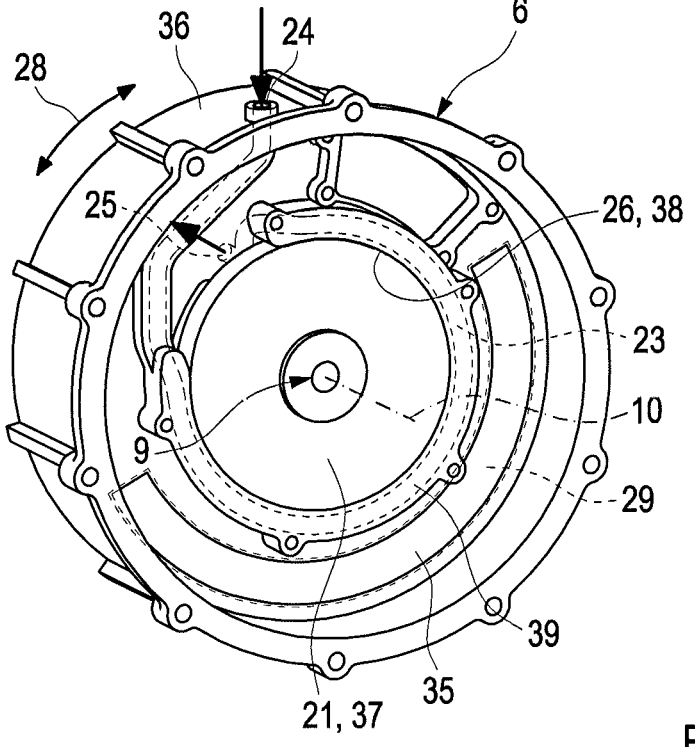
Figure 5:
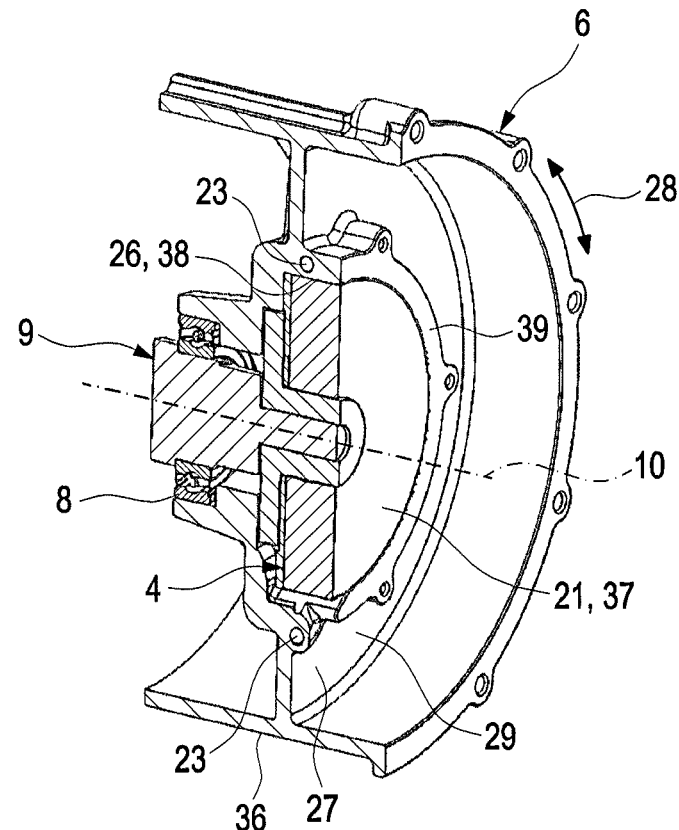
Figure 6:
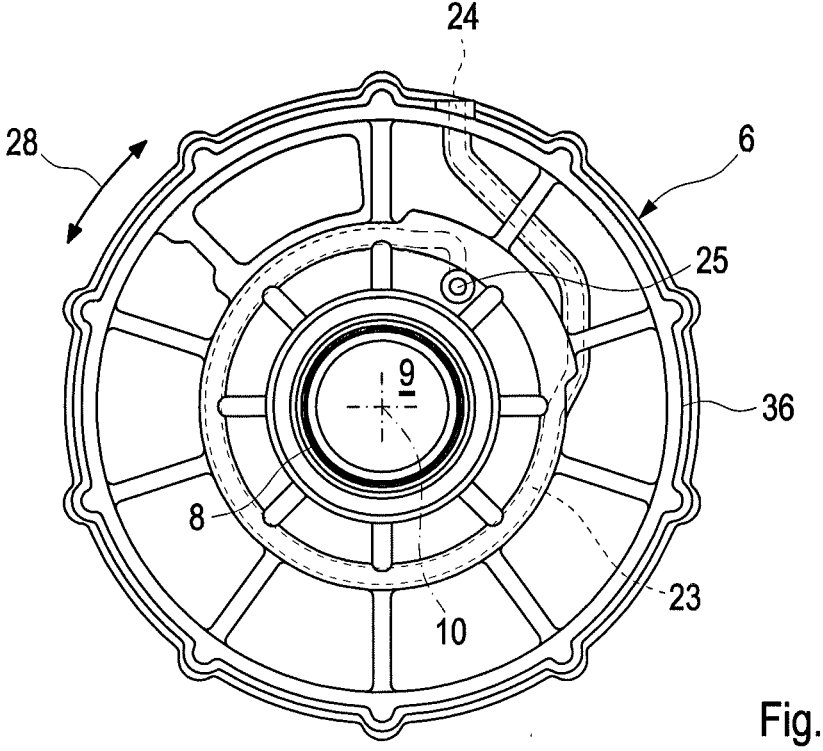
Figure 7:
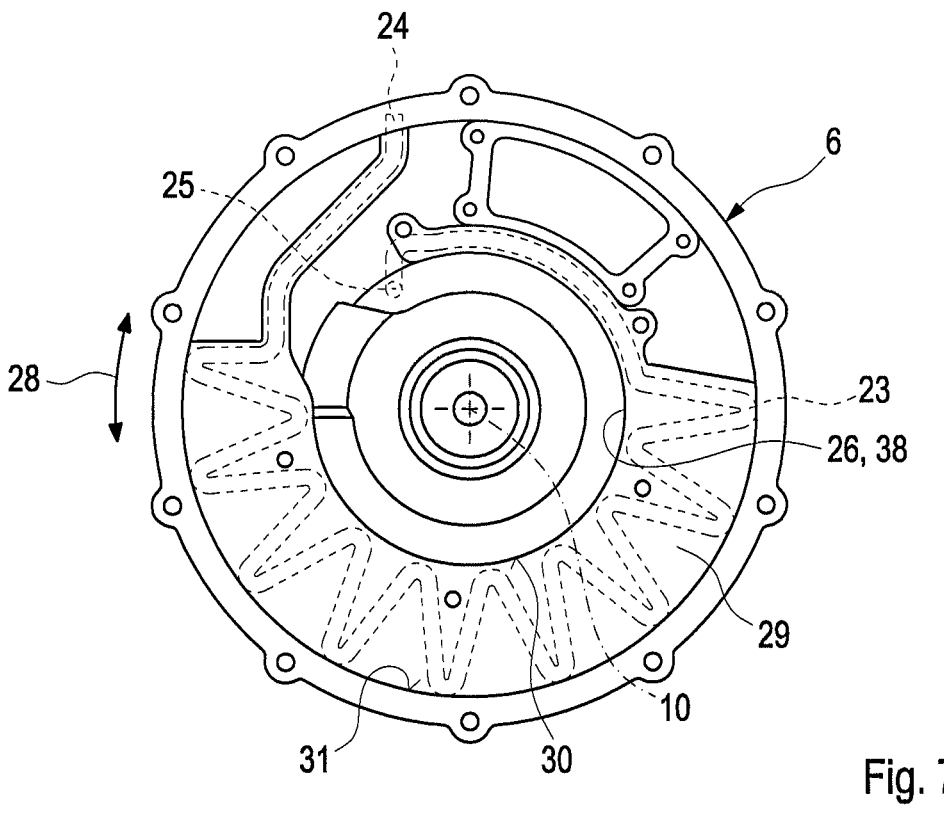
Figure 8:
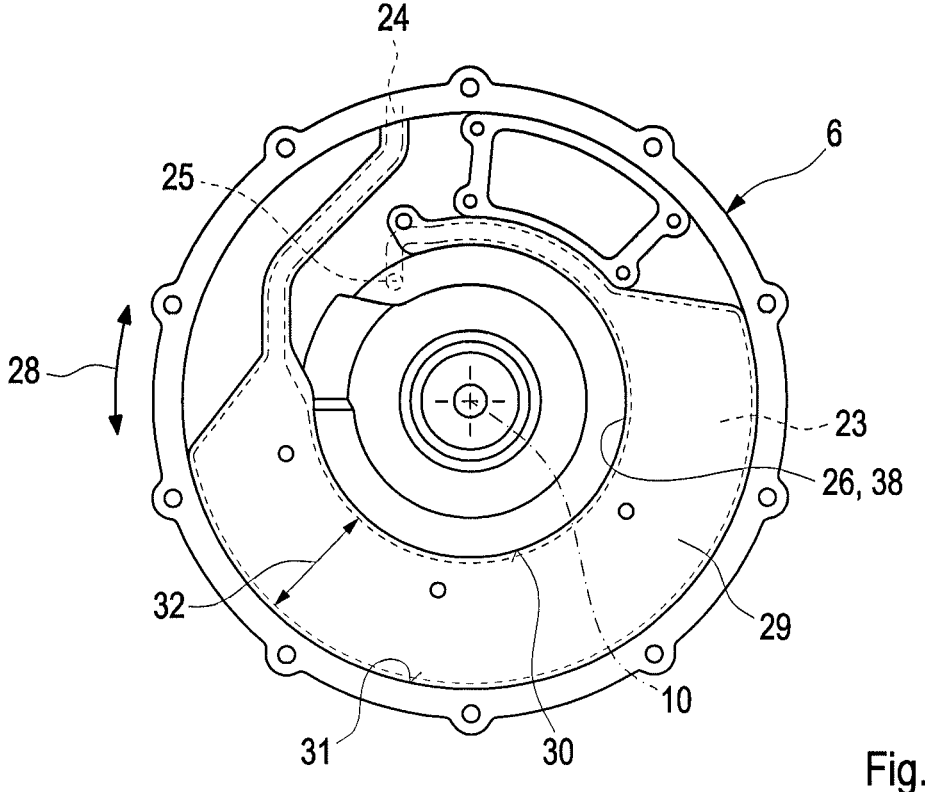
Figure 9:
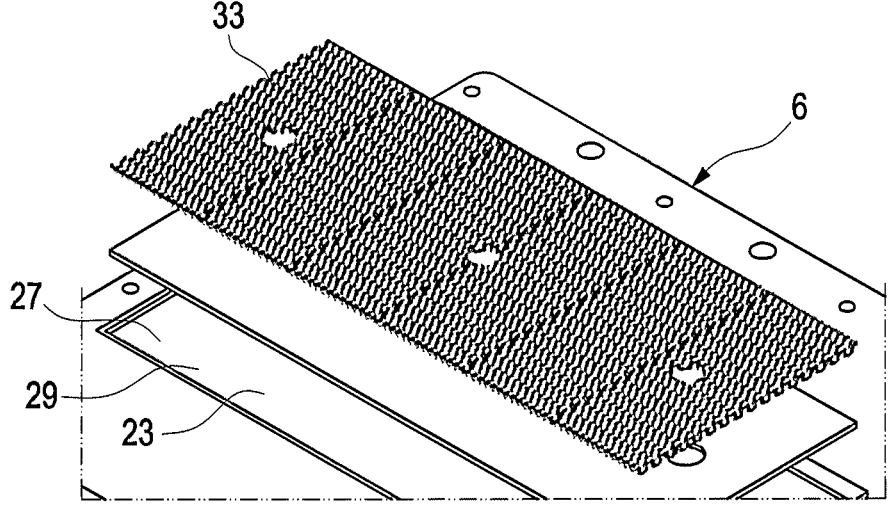

In each case schematically:

FIG. 1 shows a partially cut isometric view onto an axial end region of a synchronous machine comprising energy transmission system, FIG. 2 shows a simplified circuit diagram of an energy transmission system, FIG. 3 shows an isometric view from the outside of a bearing shield without stator-fixed component, e.g., ferrite core, of an energy transmitter of the energy transmission system, FIG. 4 shows a view as in FIG. 3 but with stator-fixed component, e.g., ferrite core, of the energy transmitter, FIG. 5 shows an isometric longitudinal section of the bearing shield comprising stator-fixed component, e.g., ferrite core, of the energy transmitter, FIG. 6 shows an axial view of the bearing shield from the inside, FIG. 7 shows an axial view of the bearing shield from the outside in the case of another embodiment, FIG. 8 shows an axial view of the bearing shield from the outside in the case of a further embodiment, FIG. 9 shows an exploded view of an enlarged detail from FIG. 8.

DETAILED DESCRIPTION

According to FIG. 1, an electrically excited synchronous machine 1, which is only partly illustrated here, has a stator 2, a rotor 3 and an energy transmission system 40. The stator 2 has a stator housing 5 comprising at least one axially front-side bearing shield 6 and a stator coil 7 for generating a magnetic stator field. Of the bearing shield 6, only one bearing 8 is shown in FIG. 1, which is arranged or formed, respectively, on the bearing shield 6. The rotor 3 has a rotor shaft 9 rotatably mounted at least on the bearing shield 6 about an axis of rotation 10. The rotor 3 moreover has a rotor coil 11 for generating a magnetic rotor field.

The energy transmission system 40 serves the purpose of transmitting electrical energy from an external, suitable energy source to the rotor coil 11. For this purpose, the energy transmission system 40 is equipped with an energy transmitter 4, which inductively or conductively effects the energy transmission. In the case of the example shown in the figures, an inductive energy transmitter 4 is shown, which represents a preferred embodiment.

An inductive energy transmitter 4, which inductively transmits the energy to the rotor coil 11, is shown accordingly in FIGS. 1 and 2. Accordingly, this is an inductively electrically excited synchronous machine 1.

The inductive energy transmitter 4 is equipped with a rotary transformer 12, which is illustrated in the circuit diagram of FIG. 2. According to FIGS. 1 and 2, the rotary transformer 12 has a stator-fixed primary transformer coil 13 and a rotor-fixed secondary transformer coil 14. In FIG. 2, an arrow 15 suggests the stationary primary side of the rotary transformer 12, while an arrow 16 suggests the rotating secondary side of the rotary transformer 12. An arrow 17 suggests the energy flow during the operation of the synchronous machine 1.

An inverter 18 as well as a direct current source are moreover suggested on the primary side 15 in the circuit diagram of FIG. 2. A rectifier 20 and a rotor coil 11 are suggested on the secondary side 16.

The energy transmitter 4 is moreover equipped here with a stator-fixed ferrite core 21, which is arranged concentrically to the axis of rotation 10. The primary transformer coil 13 is arranged in a stationary manner in this ferrite core 21. The secondary transformer coil 14 is rotatably arranged in the ferrite core 21. The rotor shaft 9 passes through ferrite core 21 and, on a disk 22 suggested in FIG. 1, carries the secondary transformer coil 14, which is connected in a rotationally fixed manner to the rotor shaft 9 via this disk 22. The primary transformer coil 13 and the ferrite core 21 in each case represent a stator-fixed component 37 of the energy transmitter 4. In the case of another, non-illustrated embodiment, the ferrite core 21 has a stator-fixed ferrite core part and a rotor-fixed ferrite core part.

According to the FIGS. 3 to 7, the bearing shield 6 can be designed as separate component part with respect to the remaining stator housing 5. An embodiment is generally also conceivable, in the case of which the bearing shield 6 is integrally molded on the stator housing 5. According to the FIGS. 3 to 7, the bearing shield 6 has at least one coolant duct 23, which is formed in the interior of the bearing shield 6. The coolant duct 23 is thereby formed directly in the material of the bearing shield 6, so that a coolant flowing through the coolant duct 23 is directly in contact with the material of the bearing shield 6. The coolant is preferably a dielectric oil or a mixture of dielectric oil and air. The bearing shield 6 moreover has a coolant inlet 24 as well as a coolant outlet 25.

For the improved cooling of at least one stator-fixed component 37 of the energy transmitter 4, the respective component 37 can be arranged in or on the bearing shield 6 so as to transmit heat. For this purpose, the bearing shield 6 according to the FIGS. 4 and 5 can have a receptacle 38, into which the respective component 37 is inserted. The receptacle 38 has an enclosure 39, which revolves in the circumferential direction 28 in the manner of a collar and which is suggested by a double arrow in the FIGS. 1 and 3 to 8 and which revolves around the axis of rotation 10. This enclosure 39 engages around the component 37 inserted into the receptacle 38. In the concrete example, the receptacle 38 is designed as core receptacle 26, which is expediently formed in combination with the enclosure 39 complementary to the ferrite core 21.

According to the FIGS. 4 and 5, the ferrite core 21 is arranged in a rotationally fixed manner on or in the bearing shield 6, respectively, so as to transmit heat. For this purpose, said core receptacle 26 is formed in the bearing shield 6 with enclosure 39, which is or are formed, respectively, complementary to the ferrite core 21, so that the ferrite core 21 can be inserted in a rotationally fixed manner into the core receptacle 26. In the case of the preferred examples shown here, the core receptacle 26 and the ferrite core 21 are located on an axial outer side of the bearing shield 6, which faces away from the bearing housing 5 or from the rotor 3, respectively. The bearing shield 6 is thus in particular arranged axially between the ferrite core 21 and the rectifier 20.

The heat-transmitting coupling between the ferrite core and the bearing shield can be realized directly by means of a pre-stressed attachment and/or indirectly by means of the use of thermally conductive materials, such as, for example, thermal paste and thermal pads.

As can be gathered from the FIGS. 3 to 7, the coolant duct 23 is formed in an annular region 27 of the bearing shield 6, which is arranged concentrically to the ferrite core 21 and thus concentrically to the axis of rotation 10. The coolant duct 23 extends along the ferrite core 21 over at least 180° in the circumferential direction 28. The axis of rotation 10 thereby defines an axial direction of the synchronous machine 1, wherein the axial direction runs parallel to the axis of rotation 10. A radial direction stands perpendicular on the axis of rotation 10.

In the case of the examples shown here of FIGS. 3 to 8, the coolant duct 23 runs over at least 360° in the circumferential direction 28. In the FIGS. 3 to 6, a first embodiment is shown, in the case of which the coolant duct 23, from the coolant inlet 24 all the way to the coolant outlet 25, quasi has a cross section, which can be flown through in an essentially constant manner and which is designed to be round, in particular circular, in the example. In the case of an embodiment not shown here, the coolant circuit 23 can be configured spirally, so that it extends over more than 360° in the circumferential direction 28. The coolant duct 23 can at least partly extend in the circumferential direction 28 within the enclosure 39 mentioned further above.

According to the FIGS. 3 to 8, an annular segment-shaped cooling region 29, which extends concentrically to the ferrite core 21 over at least 90° in the circumferential direction 28, can be formed on the bearing shield 6. In the shown examples, this cooling region 29 extends over approximately 180" in the circumferential direction 28.

According to FIG. 7, the coolant duct 23 in the case of a second embodiment can extend in a meander-shaped manner within this cooling region 29. According to FIG. 7, the coolant duct 23 runs back and forth between a radially inner inner end 30 of the cooling region 29 and a radially outer outer end 21 of the cooling region 29 in the cooling region 29.

In the case of a third embodiment, the coolant duct 23 can alternatively have a flat cross section 32, which can be flown through, in the cooling region 29 according to FIG. 8. This flat cross section 32 extends from the radially inner end 30 of the cooling region 29 all the way to the radially outer end 31 of the cooling region 29. The cross section 32 of the coolant duct 23, which can be flown through, is flat because its width measured in the radial direction is larger, in particular at least 5 times larger, than its height measured in the axial direction.

In the two cases of the second and third embodiment, a large-area cooling of the cooling region 29 is thus created on the bearing shield 6. According to FIG. 9, it can optionally be provided that a cooling structure 33, which improves the beat transmission between the bearing shield 6 and the coolant, is arranged in the flat cross section 32 of the coolant duct 23, thus within the cooling region 29. The cooling structure 33 can be formed with ribs, nubs, pins and the like as well as with any combination thereof.

The synchronous machine 1 has a power electronics 34, which has several components 35. For example, the inverter 18 of the rotary transformer 12 has such a component 35 of the power electronics 34. Further components of the power electronics 34, which are not shown here, however, can also be provided for supplying current to the stator coil 7 as well as for controlling the synchronous machine 1.

An assembly region for at least one component 35 of the power electronics 34 can be created on the bearing shield 6 in the annular region 27 or in the cooling region 29, respectively. By means of the cooling of the bearing shield 6 and in particular by means of the intensive cooling of the cooling region 29, an overheating of the respective component 35 of the power electronics 34 can be prevented efficiently. Waste heat of this component 35 can in particular also be dissipated efficiently.

The heat-transmitting coupling between the ferrite core 21 and the bearing shield 6 on the one hand and between the respective component 35 of the power electronics 34 on the other hand can be realized by means of a pre-stressed attachment and/or by means of the use of thermally conductive materials, which are not shown here, such as, for example, thermal paste and thermal pads.

The bearing shield 6 can be a cast part, which can be produced with integrated coolant duct 23, for example with lost casting core. The bearing shield 6 can also be a 3D printed part. It is likewise conceivable to configure the bearing shield 6 in several parts in order to form the coolant duct 23 therein.

In the case of the examples shown here, the coolant inlet 24 is oriented radially and is arranged on a radial outer circumference 36 of the bearing shield 6. In contrast thereto, the coolant outlet 25 is oriented axially in the examples and is arranged on an inner side of the bearing shield 6, which, in the assembled state, faces the stator housing 5 and the observer only in FIG. 6. The coolant duct 23 can thereby be connected particularly easily via the coolant outlet 25 to a coolant inlet of a rotor cooling, which is not shown here, which has, for example, a rotor coolant duct guided through the rotor shaft 9.

In the case of the examples shown here, the ferrite core 21 and/or the respective component 35 of the power electronics 34 is arranged on an outer side facing away from the stator housing 5.

The invention claimed is:

1. An electrically excited synchronous machine, comprising:
   a stator, having a stator housing including at least one axially front-side bearing shield and a stator coil for generating a magnetic stator field,
   a rotor, having a rotor shaft rotatably mounted at least on the bearing shield about an axis of rotation and a rotor coil for generating a magnetic rotor field,
   an energy transmission system including an energy transmitter for transmitting electrical energy to the rotor coil and at least one stator-fixed component arranged rotationally fixed manner in or on the bearing shield to transmit heat, wherein the energy transmitter is designed for the inductive transmission of electrical energy and has a rotary transformer including a stator-fixed primary transformer coil and including a rotor-fixed secondary transformer coil,
   the bearing shield includes at least one coolant duct having a coolant inlet and a coolant outlet, the bearing shield is actively cooled by a coolant guided through the coolant duct,
   the energy transmitter has a stator-fixed ferrite core arranged concentrically to the axis of rotation and in which the primary transformer coil is arranged in a stationary manner and the secondary transformer coil in a rotatable manner,
   the ferrite core is arranged in a rotationally fixed manner in or on the bearing shield to transmit heat, the coolant duct runs radially outside of the ferrite core in the bearing shield,
   the ferrite core is arranged concentrically in the cooling region,
   the bearing shield has a receptacle, in which the ferrite core is arranged,
   the receptacle has an enclosure, the radial inner contour of which is adapted to a radial outer contour of the ferrite core, and
   the coolant duct extends at least partially through the enclosure in the circumferential direction.

2. The synchronous machine according to claim 1, wherein
   the ferrite core is arranged concentrically to the axis of rotation in or on the bearing shield.

3. The synchronous machine according to claim 2, wherein
   the primary transformer coil is axially and radially arranged in the ferrite core in a stationary manner,
   the secondary transformer coil is axially and radially arranged in the ferrite core in a rotatable manner.

4. The synchronous machine according to claim 3, wherein
   the enclosure revolves around the ferrite core in the circumferential direction in the manner of a collar.

5. The synchronous machine according to claim 4, wherein
   the coolant duct extends in an annular region of the bearing shield, which is arranged concentrically to the axis of rotation.

6. The synchronous machine according to claim 5, wherein
   the ferrite core is arranged concentrically in the annular region.

7. The synchronous machine according to one of claim 6, wherein
   the coolant duct extends over at least 180° in the circumferential direction.

8. The synchronous machine according to claim 7, wherein
   the coolant duct extends in a meander-shaped manner in the cooling region and runs back and forth between a radially inner end of the cooling region and a radially outer end of the cooling region.

9. The synchronous machine according to claim 8, wherein
   the coolant duct has a flat cross section in the cooling region flown through extending from a radially inner end of the cooling region all the way to a radially outer end of the cooling region.

10. The synchronous machine according to claim 9, further comprising
   a cooling structure arranged in the flat cross section of the coolant duct.

11. The synchronous machine according to claim 10, wherein
   at least one component of a stator-fixed power electronics of the synchronous machine is arranged on the bearing shield to transmit heat.

12. The synchronous machine according to claim 11, wherein
   at least one component of the power electronics is arranged in the cooling region on the bearing shield to transmit heat.

13. The synchronous machine according to claim 12, wherein the stator housing does not have a stator cooling including a stator coolant duct extending in the stator housing.

14. The synchronous machine according to claim 12, wherein the stator housing has a stator cooling including a stator coolant duct extending in the stator housing fluidically separated from the coolant duct in the bearing shield.

15. The synchronous machine according to claim 12, wherein the synchronous machine is designed as wet-running electrical machine, wherein a cooling circuit of the synchronous machine guides a coolant through an interior space of the stator housing, the rotor is in contact with the coolant, wherein the cooling circuit is fluidically coupled to the coolant duct of the bearing shield.

16. The synchronous machine according to claim 15, wherein the rotor has a rotor cooling including a rotor coolant duct extending in the rotor fluidically coupled to the coolant duct in the bearing shield.

17. A traction motor for a motor vehicle, comprising:

a stator having a stator housing and a stator coil for providing a magnetic stator field, a bearing shield attached to the stator housing and including a coolant duct having a coolant inlet and a coolant outlet, a rotor having a rotor shaft rotatably mounted on the bearing shield about an axis of rotation and a rotor coil for providing a magnetic rotor field, an energy transmission system having an energy transmitter, wherein the energy transmitter transmits electrical energy to the rotor coil, and a rotary transformer including a stator-fixed primary transformer coil and a rotor-fixed secondary transformer coil.

18. The traction motor according to claim 17, wherein the energy transmission system includes a stator-fixed ferrite core arranged concentrically to the axis of rotation when the primary transformer coil is arranged in a stationary manner and the secondary transformer coil in a rotatable manner.

19. The traction motor according to claim 18, wherein the coolant duct extends in an annular segment-shaped cooling region of the bearing shield arranged concentrically to the axis of rotation extending over at least 270° in the circumferential direction along the stator fixed ferrite core.

20. The traction motor according to claim 17, wherein the stator housing has multiple bearing shields integrally molded on the stator housing.

* * * * *